United States Patent [19]

Welch

[11] 4,114,524
[45] Sep. 19, 1978

[54] FILLER CAPPER MACHINE

[75] Inventor: Gray Gurney Welch, Winston-Salem, N.C.

[73] Assignee: Royal Cake Company, Winston-Salem, N.C.

[21] Appl. No.: 606,931

[22] Filed: Aug. 22, 1975

[51] Int. Cl.² .................... A21C 15/00; B65G 57/00
[52] U.S. Cl. ............................... 99/450.4; 198/406; 198/420; 198/442
[58] Field of Search ........................ 99/450.4, 99/450.5, 450.7, 443 C; 198/31 AC, 89, 96, 101, 374, 406, 420, 422, 442; 193/47

[56] References Cited

U.S. PATENT DOCUMENTS

| 690,891 | 1/1902 | McCoy | 198/96 |
|---|---|---|---|
| 1,337,896 | 4/1920 | Fuller | 198/96 |
| 1,879,944 | 9/1932 | Muth | 198/31 AC |
| 2,910,017 | 10/1959 | Oakes | 99/450.4 |
| 3,344,902 | 10/1967 | Crawford | 198/96 |
| 3,783,772 | 1/1974 | Fay | 99/450.4 |
| 3,810,554 | 5/1974 | London | 198/31 AC |

Primary Examiner—Harvey C. Hornsby
Attorney, Agent, or Firm—Gipple & Hale

[57] ABSTRACT

A sandwich making machine for automatically making sandwiches having filling material located between the two cookie halves. The machine comprises a dividing mechanism for receiving rows of cookie halves and for automatically directing alternate rows of cookie halves to a top conveyor and a bottom conveyor. The bottom conveyor is positioned below the divider mechanism and the top conveyor is positioned adjacent the divider mechanism. A cookie aligning mechanism comprising a deadplate and a pusher bar is positioned adjacent the bottom conveyor and under the top conveyor to receive cookie halves and feed the cookie halves in aligned rows onto the bottom conveyor. A filling applicator is located above the bottom conveyor and in the path of travel of the bottom conveyor for applying filling to rows of cookie halves carried by the bottom conveyor. The top conveyor transports alternate rows of cookie halves and deposits the cookie halves at a sandwich location downstream from the filling applicator. The cookie halves from the top conveyor are deposited onto a deadplate and pushed from the deadplate by a pusher bar which aligns the cookie halves and deposits the cookie halves on the topped halves at the capping point.

8 Claims, 4 Drawing Figures

FILLER CAPPER MACHINE

BACKGROUND OF THE INVENTION

The present invention relates to cookie or cake topping machines and more specifically to a machine for producing soft cookie sandwiches in which there is a top half, a bottom half and a filling between them.

Many machines are presently in the art which automatically make sandwich cookies. Most sandwich cookie forming machines are designed to handle sandwich cookie halves having a relatively hard and rigid texture. This machinery is not applicable in dealing with cookies having a texture and softness which is similar to cake. In other machines, the cakelike cookies come out of the oven onto a cooling conveyor in misaligned rows or in rows which vary according to linear position. Most of such sandwiching machinery is programmed to operate at spaced intervals which does not take into consideration the slight variations in placement of cookies along the processing belt. This variation results in misapplication of the filling and misalignment and misapplication of filling causes product waste along with the cost of sorting acceptable cookies from the mass of cookies. This problem has generally been solved by taking the cookies off the cooling conveyor by hand and placing the cookies on a continuous cookie making machine. Attempts have been made to automatically index the cookies into proper position through the use of a pusher bar. Once the cookies are aligned they are then fed by a conveyor into the sandwich machine where a filler deposits a load of filling on the bottom cookie half forming a mound in the center of the bottom half of the cookie. This mound of filling requires either that the cookie must be rolled so that the filling is spread over the cookie or when the top is applied that it be pressed down to evenly distribute the filling between the two halves. While such techniques are acceptable in processing hard cookies, they tend to compress and crush the softer, cake-type cookies.

It is the object of the present invention to synchronize the various functions of the machine according to the arrival and placement of the two cookie halves. The machine filler of the invention applies the filling to the bottom half of the cookie in such a manner that it is relatively evenly distributed in a ring or doughnut shape so that it does not require a pressing down of the top half or rolling the bottom half to accomplish an even distribution of the filling. The inventive machine also aligns the cookies received from the cooling conveyor and deposits them in aligned rows in a sequential manner so that alternate rows are carried in position by a top conveyor and a bottom conveyor. The cookies carried on the bottom conveyor are turned so that the side which rested on the oven surface or plate is upturned to receive the filling thus presenting an attractive symmetrical cookie sandwich.

DETAILED DESCRIPTION OF THE DRAWINGS

Figure 1:
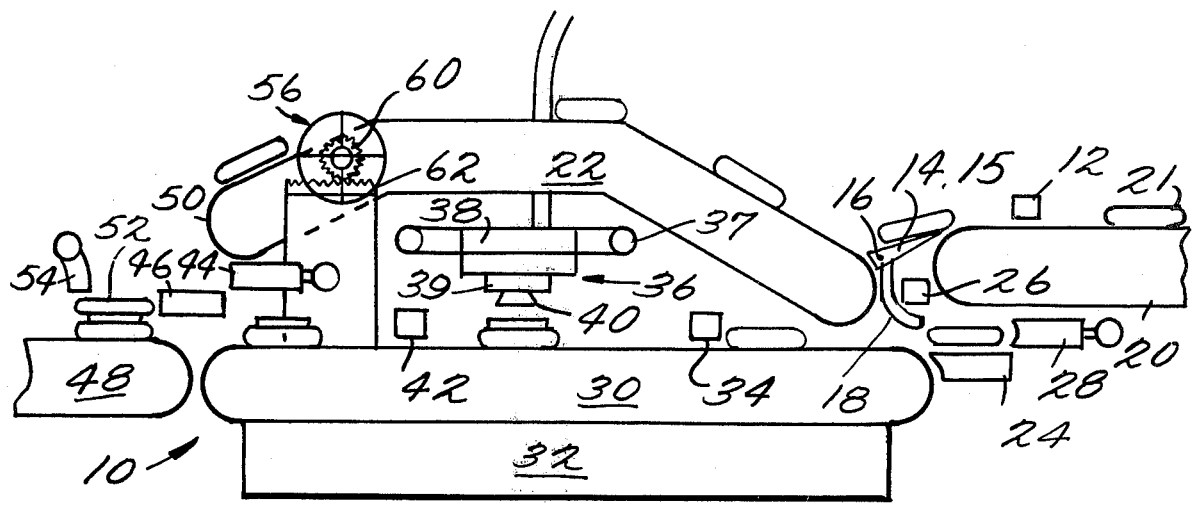
FIG. 1 discloses a schematic representation of the invention showing the component parts of the invention.
Figure 2:
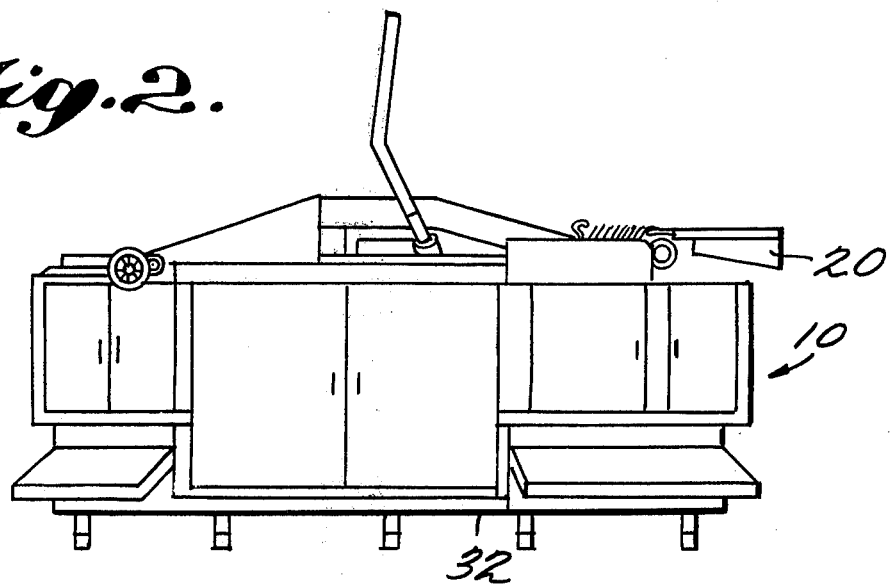
FIG. 2 discloses an elevated side view of the machine.
Figure 3:
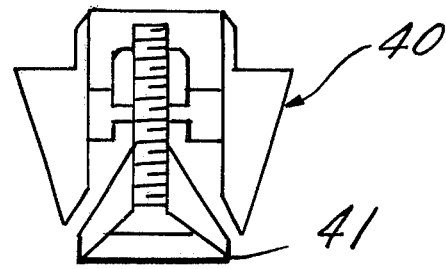
FIG. 3 shows an enlarged cross-sectional view of the filling nozzle of the invention.

The machine 10 as shown in the figures is adapted to receive rows of cookies and cakes arranged in rows from an infeed cooling conveyor 20 which delivers rows of cookies or cake halves 21 from a baking oven not shown. The baked products are either carried through the baking oven on a conveyor which becomes a cooling conveyor once the cookie halves leave the oven or are automatically conveyed into and out of the bakery oven onto the cooling conveyor 20. The cooling conveyor 20 is constructed of a metal mesh which allows crumbs from the cookie to pass there through onto cleaning pans positioned under the conveyor. The cookies as delivered from the oven by the cooling conveyor 20 have a top side and a bottom side, the bottom side being immediately adjacent to the surface of the conveyor 20. The cooling conveyor carries the cookies in rows which may vary in the number of cookies and in the alignment of the cookies. As the rows of cookies are carried by the infeed cooling conveyor 20, an electric eye 12 detects the approach of a row of cookies and activates the cookie divider 14. The cookie divider 14 is comprised of a plurality of substantially triangularly shaped fingers 15 which rest in close proximity to the upper surface of the infeed conveyor 20. The divider fingers 15 are mounted to and pivotable on a pivot point defined by shaft 16 and on alternate signals from electric eye 12, the shaft is rotated and pivots upwardly to allow a row of cookies 21 to be carried from the conveyor 20 into a turnover chute 18. After each alternate signal the shaft is rotated back to its original position thereby placing the divider finger 15 in proximity to the conveyor 20 so that the following row of cookie halves does not fall into the turnover chute 18 but is guided across divider fingers 15 onto a top conveyor 22. The speed with which the endless meshed belt of conveyor 20 carries the cookie halves causes the cookie halves to slide across the divider fingers 15 onto the top conveyor 22. The turnover chute 18 is provided with an arcuate surface so that the top side of the cookie rides along the circular pathway defined by the turnover chute 18 onto a flat surfaced deadplate 24. When positioned on the deadplate 24 the top side of the cookie half is immediately adjacent to the surface of the deadplate 24. An electric eye mechanism 26 is positioned away from the turnover chute 18 to detect the row of cookie halves falling through the turnover chute 18. When the beam of light is interrupted by the falling cookie halves, a signal is generated from the electric eye activating a pusher plate 28 which moves forward to push the cookie halves off the deadplate 24 onto a bottom conveyor 30. The pusher plate 28 is serrated or formed with a plurality of arcuate surfaces which receive the round cookie halves and aligns them into rows on the bottom conveyor. It should be noted that as the cookie halves pass over the divider 14 onto the top conveyor 22 that they are not aligned other than the general alignment which they previously maintained on the cooling conveyor. The electric eye mechanism 26 alternatively and preferably comprise several electric eyes placed at various positions which positions are calculated to detect a row of cookie halves of varying numbers. As an example, a four in a row batch of large diameter cookie halves would require an electric eye at one position whereas a ten in a row batch of smaller diameter cookie halves might require an electric eye in another position.

A plurality of electric eyes are positioned in the preferred embodiment so that the conveyor system can be easily adapted to the size of the cookies used by activating the particular electric eye or eyes appropriate to determine the number of cookie halves being run in each row during any particular time. The bottom conveyor 30 is supported by a suitable support frame 32 so that the endless belt of the conveyor can be maintained in a desired position. When the cookie halves are delivered onto the bottom conveyor 30 by the pusher plate 28 they are carried by the movement of the belt past another electric eye 34 positioned along side the endless belt conveyor which activates the filler mechanism 36. The filler mechanism 36 comprises a reservoir 38 adapted to receive and contain a supply of the filling material, a header 39 mounted to the bottom of the reservoir and a plurality of adjustable nozzles 40 mounted to the header 39. The number of nozzles 40 can be varied by adjusting the header to receive filling in various sectors to accomodate a varying number of cookie halves such as may be found in a particular run of the sandwich product production. The nozzle or nozzles 40 are preferably formed with a frusto-conical shaped deflector 41 adjustably mounted in the center of a circular nozzle housing having a tapered conical tip so that the creamer filling material is deposited as a doughnut shaped configuration on the cookie half and is thus evenly distributed across the bottom cookie half surface of the cookie halves being carried by the bottom conveyor 30. The filler mechanism 36 is mounted above the bottom conveyor 30 on a movable mount so that it can move forwardly and backwardly in synchronization with each cookie half row passing underneath carried by bottom conveyor 30. The electric eye 34 detects the approach of a row of cookie halves and produces a signal which activates drive means 37 of the filler mechanism 36 moving it forward until it is in registry with the row of cookie halves being carried on the conveyor whereupon an appropriate amount of filling material is deposited under pressure onto the row of cookie halves carried by the bottom conveyor 30.

The cookie half rows thus topped with a doughnut configured filling are moved or carried by the bottom conveyor 30 and the row of topped cookies is detected by another electric eye 42. As the topped row of cookie halves approaches the capping point 52 on the bottom conveyor 30, the alternate row of cookie halves which have been deflected onto the top conveyor 22 are delivered off the drop end 50 of the top conveyor 22 onto a deadplate 46. A pusher plate 44 is activated by the electric eye 42 in response to the approach of a row of topped cookie halves on the bottom conveyor 30. The pusher plate 44 is serrated or formed with a plurality of arcuate surfaces, so as it pushes the row of cookies off deadplate 46, it also corrects alignment so that they drop in perfect registry onto the topped row of cookie halves on the bottom conveyor 30 at capping point 52.

Figure 4:
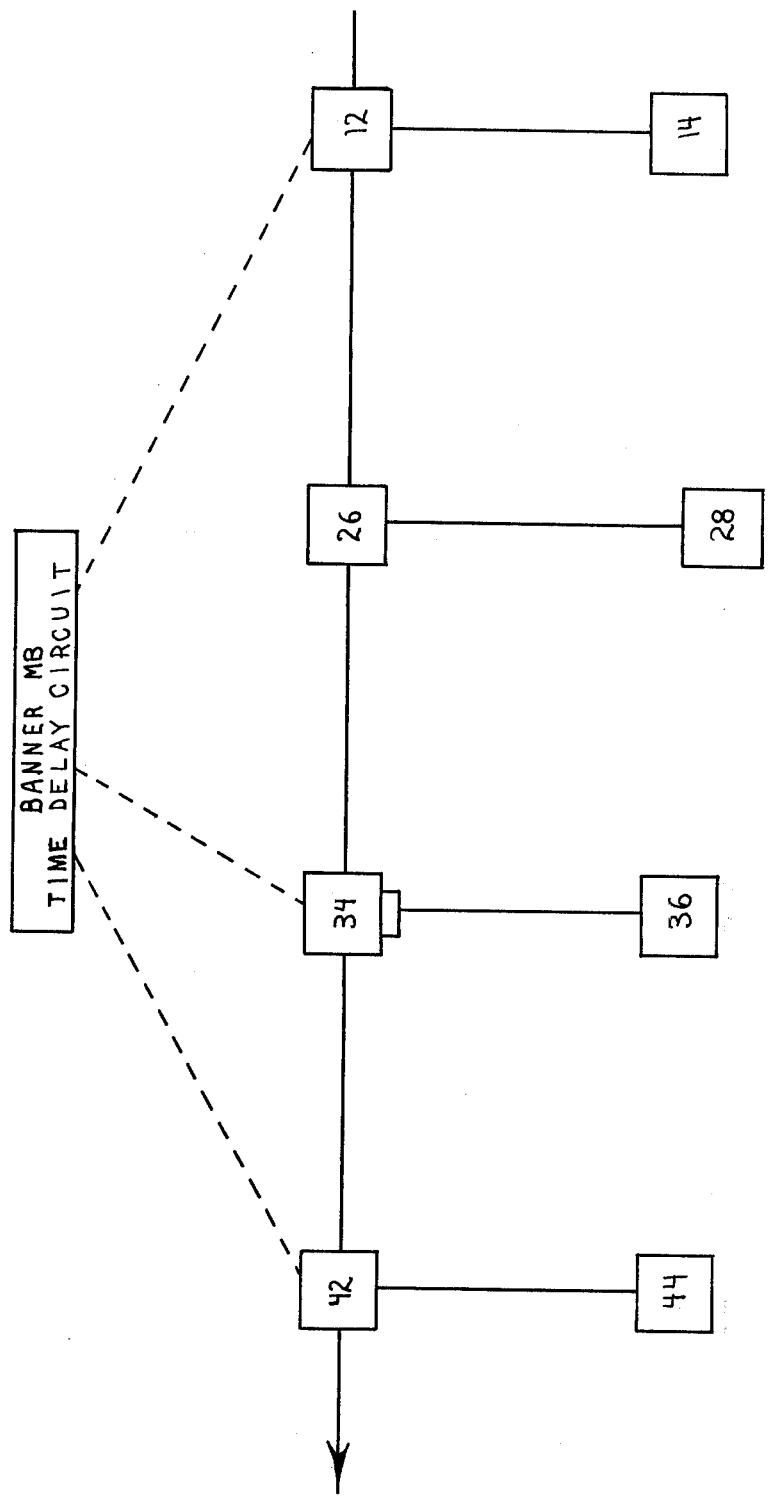
FIG. 4 is a schematic diagram of the control system of the invention.

The Banner MB time-delay circuit shown in FIG. 4 is a shelf purchased item. The MB designates a one-second on-off delay characteristic. The effect of the Banner MB time-delay circuit on the apparatus is as follows:

The cookie divider 14 alternates the rows of cookies entering the machine to the top and bottom conveyors and is activated by electric eye 12 and controlled by the time-delay circuit Banner M8 shown in FIG. 4.

The pusher plate 28 that aligns and pushes the cookies on to the lower conveyor is activated by electric eye 26 and the pusher plate 44 that aligns and pushes the cookies coming from the top conveyor on to the filled cookies coming from the bottom conveyor is activated by electric eye 42. Both electric eyes are controlled by the time-delay circuit Banner M8.

The filler mechanism 36 that dispenses filling material on the cookies being carried on the lower conveyor is activated by electric eye 34.

The filling material is dispensed during the forward motion of the filler mechanism 36 when activated by electric eye 34 thru the adjustable time-delay circuit which controls the dispensing time of filling material from the filler mechanism 36.

The top conveyor 22 is preferably arcuate in shape which not only allows space for the various equipment required to function above the bottom conveyor 30 but also provides a greater distance for travel so that a first row of cookie halves delivered by way of the turnover chute 18 onto the bottom conveyor 30 arrive at the capping point 52 at the same time as the following row of cookies carried by way of divider 14 onto the longer top conveyor 22 arrives at capping point 52.

It will be appreciated that the registry of the top cookie half with the bottom cookie half at capping point 52 is critical. At relatively high speeds of operation, the slightest error in registry will result in an imperfect capping. Therefore, even though bottom row and top row are perfectly aligned and sychronized, the slight variations in weight of the cookies produces slight variation in the momentum gained from the action of the pusher plate 44. For this reason, there is provided a retarder flap 54 made of canvas or some suitably limp, flexible material. The retarder flap 54 equalizes the momentum of the cookies so that the entire row drops in perfect registry at capping point 52.

The top conveyor 22 is mounted on a movable support 56 comprising a pinion gear 60 rotatably mounted on the top conveyor 22 and a toothed rack 62 secured to the bottom conveyor 30 which engages and meshes with the gear teeth of the pinion gear 60. The adjusting mechanism enables the top conveyor 30 to be adjusted forwardly or backwardly in relation to the divider 14 and the capping point 52. This flexibility enables the operator to effect such minor adjustments as may be needed to achieve a perfect mating at capping point 52. The speed of the top conveyor 22 can also be varied so as to achieve a perfect synchronization between the bottom half cookies moving along the bottom conveyor 30 and the top half cookies moving along the top conveyor 22.

While the preferred embodiment of the invention has been disclosed, it is understood that the invention is not limited to such an embodiment since it may be otherwise embodied in the scope of the appended claims.

What is claimed is:

1. A sandwich making machine for receiving rows of cookie halves off of an infeed conveyor transporting the cookie halves away from a cookie oven and automatically making soft cookie sandwiches having filling material located between the two cookie halves comprising two conveyor means positioned one above the other to form a top conveyor means and a bottom conveyor means, a moveable bridge means comprising a moveable member positioned adjacent said top conveyor means adapted to be selectively moved in a plurality of alternating positions, one of said positions permitting the bridge means to move out of contact with a first row of cookies into an open position and another alternate position permitting said bridge means to receive the following row of cookie halves from said infeed conveyor and allow continuous movement of each subsequent alternate row of cookie halves to said top conveyor means from said infeed conveyor across said bridge means by utilizing the momentum of the cookie halves as they are discharged from the infeed conveyor, a cookie inverter means comprising a curved member positioned below said bridge member which said bottom conveyor means being positioned below said cookie inverter means, said top conveyor means being positioned substantially said bridge means, said bottom conveyor means providing transportion for rows of said inverted cookie halves through said machine, a cookie aligning means positioned adjacent said bottom conveyor means, said cookie aligning means being adapted to receive cookie halves transported and inverted by said cookie inverter means when said bridge means is in the open position and feed said inverted cookie halves in aligned rows onto said bottom conveyor, filling applicator means located above said bottom conveyor means parallel to the path of travel of the said bottom conveyor means for applying topping to rows of cookie halves carried by said bottom conveyor means, said top conveyor means being located above said bottom conveyor means for transporting alternate rows of cookie halves and depositing said cookie halves at a sandwich location downstream from said filling applicator means and a second cookie aligning means for receiving rows of cookie halves from said top conveyor means and aligning said top row of cookie halves onto said bottom cookie halves at said sandwich station, said second cookie aligning means comprising a deadplate positioned downstream from said top conveyor means, said deadplate serving to receive cookie halves carried by said top conveyor and pusher plate means adjacent to said deadplate, said pusher plate when activated engaging and depositing said cookie halves onto topped cookie halves to form a cookie sandwich.

2. A machine as claimed in claim 1 wherein said top conveyor means is movably mounted on said bottom conveyor by a rack and pinion means, said rack and pinion means comprising a pinion gear rotatably mounted to said top conveyor means and a toothed rack secured to said bottom conveyor means engaging and meshing with said pinion gear and means to rotate said pinion gear in said toothed rack.

3. A machine as claimed in claim 1 including a cookie half inverter means positioned below said bridge means, said cookie half inverter means comprising a curved plate positioned away from the end of said infeed conveyor.

4. A machine as claimed in claim 1 including electric eye means positioned upstream from said bridge means, said bridge means comprising a plurality of fingers, each finger being tapered towards said infeed conveyor, said bridge means being pivotably movable away from said infeed conveyor and operable in response to a signal received from said electric eye means positioned upstream from said bridge means, to receive alternate rows of cookie halves and transport said cookie halves to said top conveyor means.

5. A machine as claimed in claim 1 wherein said filling applicator means comprises a reservoir means including a header mounted thereto; a plurality of nozzles communicating with and connected to said reservoir means header, each nozzle comprising a nozzle housing defining a conical tip and a frusto-conical shaped center piece adjustably secured to said nozzle housing and extending from said conical tip, said nozzle being adapted to discharge doughnut shaped filling material when filling material is extruded through said nozzle.

6. A machine as claimed in claim 5 wherein said reservoir means includes a housing adapted to hold material and pressure means connected to said housing adapted to place material contained in said reservoir under pressure.

7. A machine as claimed in claim 1 wherein said cookie aligning means comprises a deadplate and a pusher bar positioned adjacent said deadplate, said pusher bar defining pockets in the front surface therein to receive and align cookie halves which it contacts.

8. A sandwich making machine for receiving rows of cookie halves from a cooling conveyor and automatically making cookie sandwiches having filling material located between two cookie halves comprising pivotal dividing means for automatically directing alternate rows of cookie halves to a top conveyor and a bottom conveyor said bottom conveyor comprising a support frame and an endless belt mounted on said support frame positioned beneath said divider means, said top conveyor being mounted on said bottom conveyor means, said divider means comprising a plurality of finger members having one end positioned adjacent said cooling conveyor allowing alternate rows of cookie halves to be transported across it from said cooling conveyor to said top conveyor, a curved plate mounted to said top conveyor beneath said divider means and adapted to receive cookie halves from said cooling conveyor and carry said cookie halves onto a deadplate mounted beneath said curved plate adjacent to said bottom conveyor, a reciprocating pusher bar separated from said bottom conveyor by said deadplate and means to activate said pusher bar positioned between said divider means and said deadplate, said pusher bar when activated aligning rows of cookie halves onto said bottom conveyor to carry said cookie halves, means to move a filling means positioned above said bottom conveyor upstream and downstream of said bottom conveyor, said filling means including a plurality of nozzles constructed to deposit a ring of filling material on said cookie halves; means to activate said filling means, a discharge conveyor positioned adjacent said bottom conveyor and adapted to receive aligned topped cookie halves bearing filling material from said bottom conveyor, said top conveyor being constructed to carry cookie halves a longer distance than said bottom conveyor, a cookie half aligning mechanism positioned proximate the ends of said top and bottom conveyor, said cookie half aligning mechanism comprising a second deadplate positioned below the downstream end of said top conveyor, a second pusher bar positioned adjacent to said second deadplate to align cookie halves deposited on said second deadplate by said top conveyor, said second pusher bar being activated by sensor means positioned between said filling means and said discharge conveyor to activate said pusher bar so that aligned cookie halves are pushed off said second deadplate in free fall against a retaining means mounted adjacent to said top conveyor so that the cookie halves from the top conveyor fall directly onto the topped cookie halves from the bottom conveyor forming filled cookie sandwiches.

* * * * *